(12) United States Patent
DeVolpi

(10) Patent No.: US 6,201,468 B1
(45) Date of Patent: Mar. 13, 2001

(54) DEFLECTION SENSOR

(76) Inventor: Dean R. DeVolpi, 806 Buchanan Blvd., #115, Boulder City, NV (US) 89005

( * ) Notice: Subject to any disclaimer, the term of this patent is extended or adjusted under 35 U.S.C. 154(b) by 0 days.

(21) Appl. No.: 09/643,153

(22) Filed: Aug. 21, 2000

Related U.S. Application Data

(63) Continuation-in-part of application No. 09/088,184, filed on Jun. 1, 1998, now Pat. No. 6,107,993.
(60) Provisional application No. 60/061,825, filed on Oct. 14, 1997.

(51) Int. Cl.$^7$ .................................................. H01C 10/10
(52) U.S. Cl. .............................. 338/47; 338/99; 338/71; 338/114; 200/5 A; 200/6 A
(58) Field of Search .................. 338/47, 99, 101, 338/114, 71; 346/157, 148, 161; 200/5 A, 6 A, 6 R, 512, 514, 517

(56) References Cited

U.S. PATENT DOCUMENTS

| | | | | |
|---|---|---|---|---|
| 4,134,295 | * | 1/1979 | Alexander | 73/189 |
| 4,444,205 | * | 4/1984 | Jackson | 128/782 |
| 5,311,779 | * | 5/1994 | Teruo | 73/726 |
| 5,496,977 | * | 3/1996 | Date et al. | 200/6 A |
| 5,541,622 | * | 7/1996 | Engle et al. | 345/161 |
| 5,583,476 | * | 12/1996 | Langford | 338/211 |

* cited by examiner

Primary Examiner—Michael L. Gellner
Assistant Examiner—Kyung S. Lee
(74) Attorney, Agent, or Firm—Quinn & Quinn, P.C.; William J. Quinn; Cornelius P. Quinn

(57) ABSTRACT

A low cost analog deflection sensor assembled from a single component part which lends itself for use as a joystick. A central contact is surrounded by peripheral contacts and aligned by a dielectric spacer. Application of deflectional force results in one or more signals of measurable resistance which can be translated into speed and directional vectors.

10 Claims, 2 Drawing Sheets

DEFLECTION SENSOR

CROSS REFERENCE TO RELATED APPLICATION

This application claims the benefit of and is a Continuation in Part of application Ser. No. 09/088,184 entitled Keystick Miniature Pointing Device, filed on Jun. 1, 1998 now a U.S. Pat. No. 6,107,993 and incorporated herein by reference, which claims the benefit of U.S. provisional patent application Ser. No. 60/061,825, filed Oct. 14, 1997, entitled Resistive Pointing Technology, and incorporated herein by reference.

FIELD OF THE INVENTION

The present invention relates generally to sensors which translate the degree and direction of deflection of an input control of the sensor into electrical resistance signals which correlate to the degree and direction of deflection forces applied to the input control; and, more specifically, to an improved low cost deflection sensor consisting of a single component part, which may be manufactured in miniature size so that it may be utilized where space for such a deflection sensor is limited.

BACKGROUND OF THE INVENTION

Deflection sensors are utilized in a myriad of different applications. Typical applications of deflection sensors include joysticks, fluid level sensors, pressure sensors, scales, security sensors, position sensors, robotic feedback position and force sensors, and the like.

As an example of an application of known deflection sensors, various computer keyboards, video game controls, hand held remote controls and similar devices are known to incorporate deflection sensors for providing joystick pointing control, through which an input of speed and directional vectors is measured and transformed into electrical signals. In such applications the design of the deflection sensor used for joystick pointing control has been dictated by several considerations, including, the necessity to miniaturize the overall size of the design, the number and cost of component parts, and the ease or difficulty encountered in mass production and the associated cost of production. Such design constraints of prior deflection sensors used for joystick pointing controls resulted in limitations of variability of speed and direction, required an extensive amount of space, exceeded the pricing point of competing products or resulted in reduction in the useful life and durability of the deflection sensor.

Additional examples of applications of known deflection sensors include, fluid level senders, pressure senders, position senders and scales which utilize deflection sensors to measure mechanical displacement values and transform them into electrical signals. Often similar in design to the deflection sensors utilized for joystick pointing control, the design constraints of the known defection sensors of these devices has resulted in the same shortcomings as those associated with the known joystick pointing controls previously referred to.

One typical deflection sensor design and method provides one or more contacts which slide upon resistive or conductive regions to effect one or more resistive signals corresponding to the direction and/or degree of deflection. The shortcomings to this method of deflection sensing are that operational contact results in abrasion of the resistive or conductive regions, reducing the sensors useful life, and assembly requires many component parts, resulting in increased size and increased manufacturing cost. U.S. Pat. No. 4,864,272 to Cecchi et al, is representative of this type of design and method of a deflection sensor.

Another typical design and method of a deflection sensor provides a pivoting conductive element which makes contact upon a substrate with electrical traces or resistive regions, to provide one or more resistive signals corresponding to the direction and/or degree of deflection. A principle shortcoming to this method being that the resistive signal resolution and the ability to miniaturize the sensor are necessarily compromised by the need to avoid overcongestion of the electrical traces or resistive regions of the substrate. U.S. Pat. No. 5,376,913 to Pine et al, and U.S. Pat. No. 5,675,309 to DeVolpi are representative of this type of design and method of a deflection sensor.

Digital designs and methods have been employed in deflection sensors. By their very nature, these designs and methods are limited in the resolution of the signals provided to indicate speed and/or direction, and miniaturization results in further limitation of signal resolution capacity. U.S. Pat. No. 5,488,206 to Wu, and U.S. Pat. No. 4,896,003 to Hsieh are illustrative of digital deflection sensors.

A further design and method for deflection sensors utilizes the measurement of the change in resistance of a piece of resistive rubber material upon compression. In practice, a mechanical means is provided to transmit compression forces to the resistive rubber. Through compression, the measurable resistance of the rubber changes, which is measured at various contact points to provide signals of measurable resistance. A principle shortcoming to this method and design are that compression of the resistive rubber causes deterioration and wear and permanent changes in the resistance value of the resistive rubber. These changes and deterioration are further accelerated when rigid materials are utilized to compress the resistive rubber.

Accordingly, it is the object of the present invention to provide an improved analog deflection sensor which adapts itself well for use as a joystick pointing device, that occupies very little space, has broad speed and direction variability, consists of a single component part which lends itself to easy assembly and mass production for a small cost, with consistent quality and durability.

SUMMARY OF THE INVENTION

The objects of the present invention are attained by a deflection sensor which uses all resistive, or a combination of resistive and conductive contact elements. The contact elements are situated in parallel alignment to each other, are elastic, and may be made of various materials. A dielectric material that is also elastic is utilized to align and provide proper spacing of the contact elements in an undeflected position in the absence of external force.

In a first embodiment of the deflection sensor which can be used as a joystick pointing device, a central contact element of resistive rubber is surrounded by a number of, (typically four), peripheral contact elements of resistive rubber. The peripheral contact elements are positioned parallel to the central contact element at various angles, (usually in an x-y axis type of orientation). A dielectric spacer of elastic material is utilized to maintain the alignment and spacing of the central contact element and the peripheral contact elements in an undeflected position in the absence of external force.

In the undeflected position, gaps are maintained between the central contact element and the peripheral contact elements. In application, the central contact element and the peripheral contact elements are secured at one end and deflectional forces are applied at the other end. Application of a deflectional force causes the central contact element, the peripheral contact elements and the dielectric spacer to bend as a unit, and causes electrical contact to be established between the central contact element and one or more of the peripheral contact elements. As the area of electrical contact between the central contact element and each peripheral contact element corresponds to the direction and intensity of the deflectional force, and as the measured resistance between the central contact element and a peripheral contact element is a function of the area of electrical contact between them, one or more signals of measurable resistance corresponding to the direction and intensity of the deflectional force is provided. These signals of measurable resistance are readily translated into speed and directional vectors by analog to digital or RC timing circuitry, with resolution limited only by the analog to digital or RC timing circuitry employed.

An alternate embodiment of the deflection sensor of the current invention provides for applications where a deflectional sensor is utilized for measurement upon a single axis. In this alternate embodiment of the deflection sensor, a central contact element of resistive rubber is surrounded by two peripheral contact elements of resistive rubber. The peripheral contact elements are positioned parallel to the central contact element in a linear arrangement. A dielectric spacer of elastic material is utilized to maintain the alignment and spacing of the central contact element and the peripheral contact elements in an undeflected position in the absence of external force.

In the undeflected position, gaps are maintained between the central contact element and the peripheral contact elements. In application, the central contact element and the peripheral contact elements are secured at one end and deflectional forces are applied at the other end. Application of a deflectional force in the axis of measurement causes the central contact element, the peripheral contact elements and the dielectric spacer to bend as a unit, and causes electrical contact to be established between the central contact element and one of the peripheral contact elements which corresponds to the direction of the deflectional force upon the axis of measurement. As the area of electrical contact between the central contact element and the peripheral contact element corresponds to the intensity of the deflectional force, and as the measured resistance between the central contact element and the peripheral contact element is a function of the area of electrical contact between them, a signal of measurable resistance corresponding to the intensity of the deflectional force is provided.

As may be apparent, the deflectional sensor of this embodiment may also be accomplished through use of the deflection sensor of the first embodiment by utilizing only the resistance signals from two peripheral contact elements upon the axis of measurement. Further, it should be apparent that a deflectional sensor to measure deflection in a single direction only may be constructed from either of the prior embodiments through use of a single resistance signal through a peripheral contact element upon the axis of measurement.

Although the deflection sensor of the present invention may be made by assembly from the separate parts consisting of a central contact element, peripheral contact elements and a dielectric spacer, the preferred method of manufacture is by way of extrusion as a single piece. Through use of an extrusion machine, an elastic dielectric material and an elastic resistive material are extruded through a die under heat and pressure which creates the central contact element the peripheral contact elements and the dielectric spacer, all in proper alignment. The deflection sensor is merely cut to the proper length for the intended application.

Receptacles to accept male connector pins or terminals of a printed circuit board can be provided in the central contact element and peripheral contact elements to secure one end of the deflection sensor and simultaneously facilitate electrical connections thereto.

Additionally, since there is virtually no compression of the resistive rubber, and as the central contact element, the peripheral contact elements and the dielectric spacer are all made of elastic material, the wear and changes in resistance to the elastic resistive material encountered where elastic resistive material contacts rigid material, is alleviated.

Other objects, advantages and novel features of the present invention will become apparent from the following drawings and detailed description of the preferred embodiments.

DETAILED DESCRIPTION OF THE PREFERRED EMBODIMENTS

A first embodiment of the present invention will now be described with reference to FIGS. 1 through 3.

Figure 1:
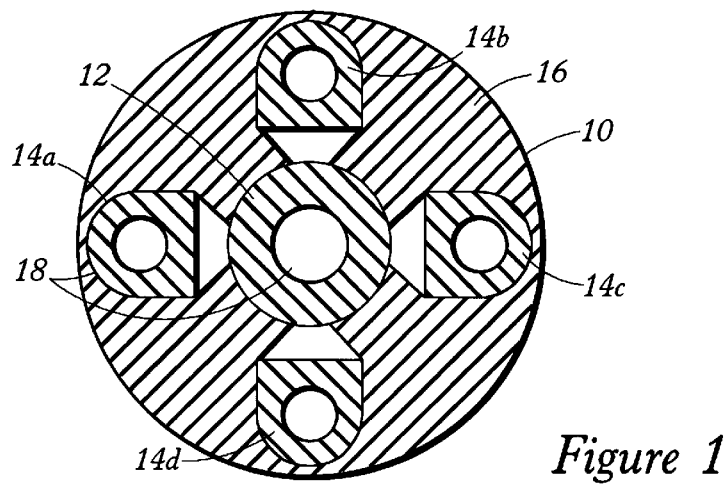
FIG. 1 is a cross sectional view of the first embodiment of the present invention.
Figure 2:
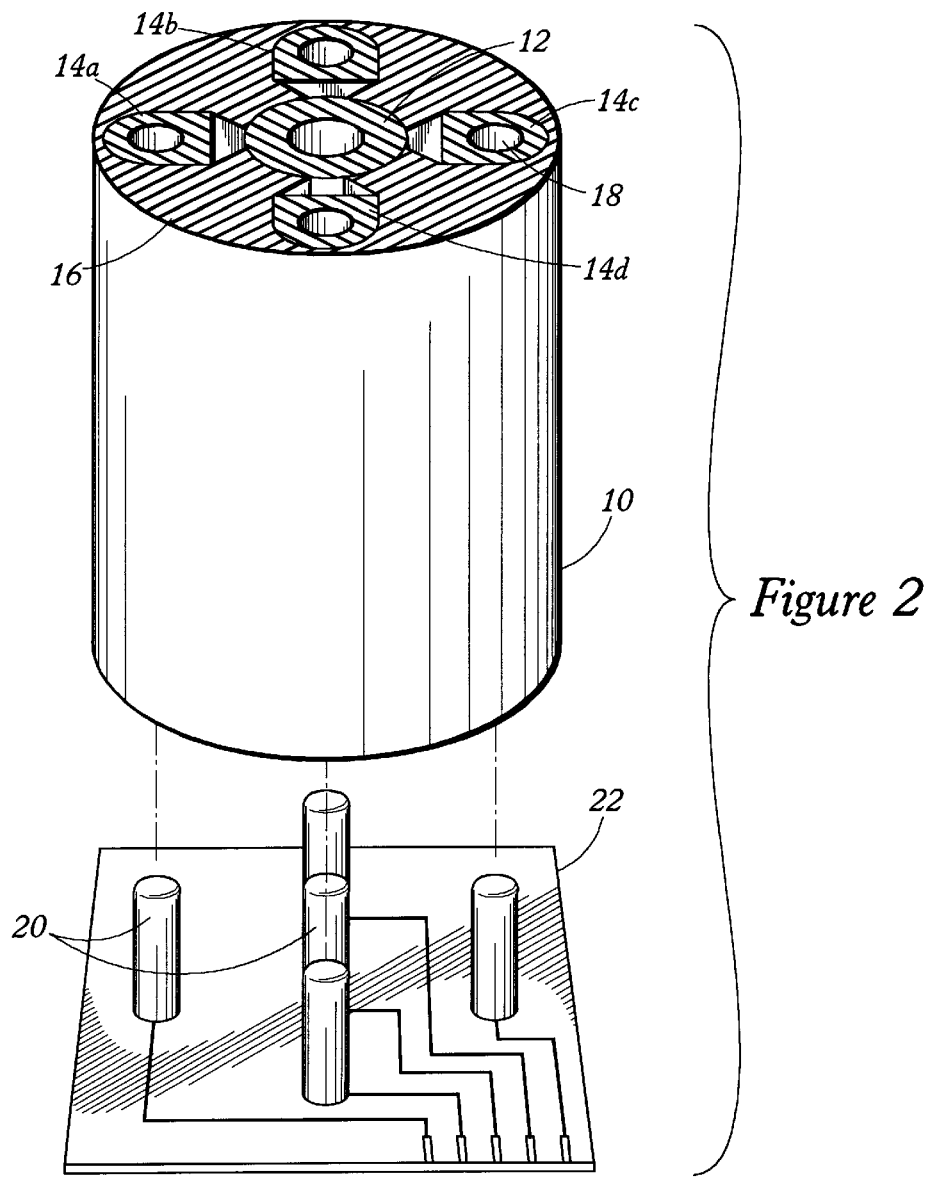
FIG. 2 is an exploded perspective view illustrating the first embodiment of the present invention with a circuit board having terminals upon which the deflection sensor can be attached and electrically connected.

The deflection sensor 10 shown in FIGS. 1 and 2 comprises a central contact element 12 which is composed of elastic material, peripheral contact elements 14a, 14b, 14c, and 14d which are made of elastic material, and a dielectric spacer 16 which is made of elastic electrically insulating material. Central contact element 12 and peripheral contact elements 14 are either electrically conductive or electrically resistive; however, either central contact element 12 or peripheral contact elements 14 must have a measurable resistance. A longitudinal axis of central contact element 12 is defined by a line connecting the uppermost end of central contact element 12 and the lowermost end of central contact element 12. A longitudinal axis for each of peripheral contact elements 14a through 14d is defined by a line from the uppermost end of the respective contact element 14 to its lowermost end. Central contact element 12 and peripheral contact elements 14a through 14d are secured by dielectric spacer 16 with their longitudinal axis parallel and with peripheral contact elements 14a through 14d surrounding central contact 12 at various angles respectively.

Central contact element 12 and peripheral contact elements 14 are formed with receptacles 18 upon their longitudinal axis, through which terminals 20 of printed circuit board 22 secure deflection sensor 10 at one end. Terminals 20 further provide electrical connections from central contact element 12 and peripheral contact elements 14 to printed circuit board 22. A cap 24 is secured to the second end of deflection sensor 10 to provide it with an aesthetically pleasing appearance.

Figure 3:
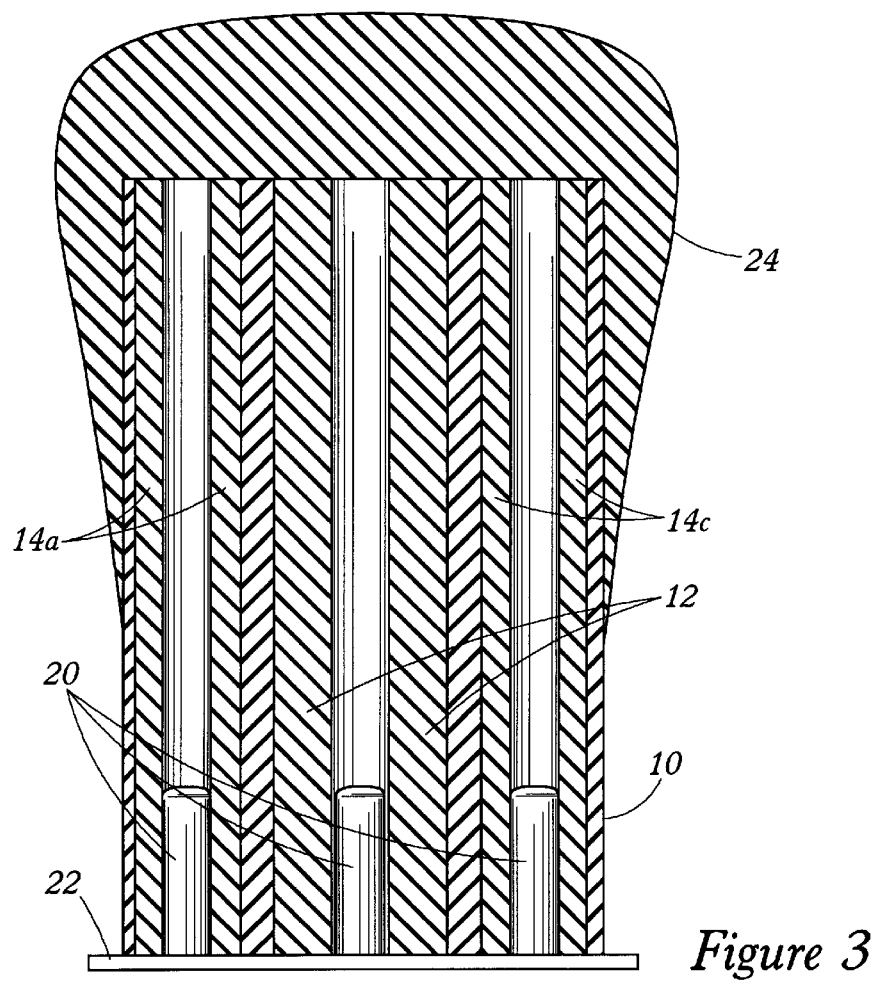
FIG. 3 is a longitudinal sectional view of the present invention that is attached to terminals of a printed circuit board and is covered by a cap at its upper end.

In operation of the device shown in FIGS. 1 through 3, when an external deflection force is applied to cap 24 in any direction perpendicular to or tangential to the longitudinal axis of central contact element 12, the force is transmitted to deflection sensor 10 thereby bending dielectric spacer 16, central contact element 12 and peripheral contact elements 14. As a result of said bending, center contact element 12 makes physical and electrical contact with at least one peripheral contact element 14. As greater deflectional force is applied to cap 24, and therefore transmitted to deflection sensor 10, a greater amount of the surface of center contact element 12 and one or more peripheral contact elements 14 will be in physical and electrical contact thereby changing the resistance proportionately. The resistance of contacts between the center contact element 12 and any one or more peripheral contact elements 14 may be measured to indicate the direction and degree of the deflectional force, and may be translated into speed and direction vectors by any available analog to digital or RC timing circuit.

When an external deflectional force is applied to the cap 24 and transmitted to elastic dielectric spacer 16 elastic central contact element 12 and peripheral contact elements 14, thereby deforming their shape, potential energy is stored; when the external deflectional force is removed the potential energy stored causes the deflection sensor 10 to return to its undeflected position.

An alternate embodiment of the present invention for use in sensing direction and force of deflection upon a single axis will now be described with reference to FIGS. 3 and 4

Figure 4:
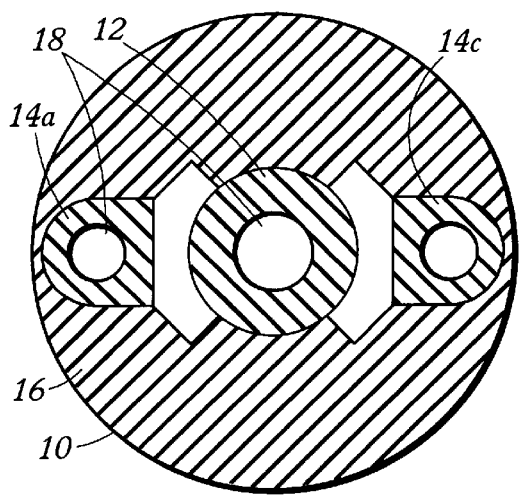
FIG. 4 is a cross sectional view of an alternate embodiment of the present invention for use in sensing the direction and degree of deflection upon a single axis.

The deflection sensor 10 shown in FIG. 4 comprises a central contact element 12 which is composed of elastic material, peripheral contact elements 14a and 14c which are made of elastic material, and a dielectric spacer 16 which is made of elastic electrically insulating material. Central contact element 12 and peripheral contact elements 14 are either electrically conductive or electrically resistive; however, either central contact element 12 or peripheral contact elements 14 must have a measurable resistance. A longitudinal axis of central contact element 12 is defined by a line connecting the uppermost end of central contact element 12 and the lowermost end of central contact element 12. A longitudinal axis for both of peripheral contact elements 14a and 14c is defined by a line form the uppermost end of the respective contact element 14 to its lowermost end. Central contact element 12 and peripheral contact elements 14a and 14c are secured by dielectric spacer 16 with their longitudinal axis parallel and with peripheral contact elements 14a and 14c on opposite sides of central contact 12 upon a line perpendicular to the longitudinal axis of central contact element 12, hereinafter referred to as the axis of measurement.

Central contact element 12 and peripheral contact elements 14 are formed with receptacles 18 upon their longitudinal axis, through which terminals 20 of printed circuit board 22 secure deflection sensor 10 at one end. Terminals 20 further provide electrical connections from central contact element 12 and peripheral contact elements 14 to printed circuit board 22. A cap 24 is secured to the second end of deflection sensor 10 to provide it with an aesthetically pleasing appearance. In operation of the deflection sensor shown in FIG. 4, when an external deflection force is applied to cap 24 in the direction of the axis of measurement or tangential to the axis of measurement, the force is transmitted to deflection sensor 10 thereby bending dielectric spacer 16, central contact element 12 and peripheral contact elements 14. As a result of said bending, center contact element 12 makes physical and electrical contact with a peripheral contact element 14 corresponding to the direction of the external deflectional force along the axis of measurement. As greater deflectional force is applied to cap 22, and therefore transmitted to deflection sensor 10, a greater amount of the surface of center contact element 12 and a peripheral contact elements 14 will be in physical and electrical contact thereby changing the resistance proportionately. The resistance of any contact between the center contact element 12 and the peripheral contact elements 14 may be measured to indicate the direction upon the axis of measurement and degree of the deflectional force.

A further alternate embodiment of the present invention for use in sensing the force of deflection only upon a single axis will now be described with reference to FIG. 5.

Figure 5:
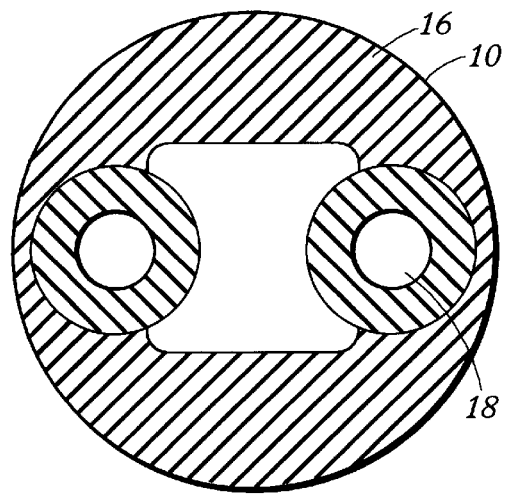
FIG. 5 is a cross sectional view of an alternate embodiment of the present invention for use in sensing the degree of deflection only upon a single axis.

The deflection sensor 10 shown in FIG. 5 having an uppermost and a lowermost end, comprises a pair of contact elements 12 which are composed of elastic material, and a dielectric spacer 16 which is made of elastic electrically insulating material. Central contact elements 12 are each either electrically conductive or electrically resistive; however, at least one of the central contact elements 12 must have a measurable resistance. A longitudinal axis for each central contact element 12 is defined by a line connecting its uppermost end and its lowermost end. Central contact elements 12 are secured by dielectric spacer 16 with their longitudinal axis parallel. A line connecting the two central contact elements 12 and perpendicular to their longitudinal axis is hereinafter referred to as the axis of measurement.

Central contact elements 12 and peripheral contact elements 14 are formed with receptacles 18 upon their longitudinal axis, through which terminals of a printed circuit board or a connector with male terminals secures deflection sensor 10 at its lowermost end. The receptacles further provide electrical connection points for central contact elements 12. In operation of the deflection sensor shown in FIG. 4, when an external deflection force is applied to the uppermost end of deflection sensor 10, in the direction of the axis of measurement, or tangential to the axis of measurement, the force causes a bending of dielectric spacer 16, and central contact elements 12. As a result of said bending, center contact elements 12 make physical and electrical contact with each other. As greater deflectional force is applied, a greater amount of the surface of central contact elements 12 will be in physical and electrical contact with each other, thereby changing the resistance proportionately. The resistance of the contact between the central contact elements 12 may be measured to indicate the degree of the deflectional force.

Although the detailed description of the drawings is directed toward illustrating the above described embodiments, the present invention is not limited to such embodiments, as variations and modifications may be made without departing from the scope of the present invention as claimed herein.

What is claimed is:

1. An analog deflection sensor comprising:
   an elastic electrically resistive central contact element, having a longitudinal axis;
   two or more elastic electrically conductive peripheral contact elements which have longitudinal axis;

an elastic dielectric spacer which secures the peripheral contact elements at various angles surrounding the central contact element with their longitudinal axis parallel to the longitudinal axis of the central contact element;

said deflection sensor has an undeflected position, whereby no contact is established between said central contact element and said peripheral contact elements, which may be variably deflected by the application of an external force to establish electrical contact between said central contact element and at least one of said peripheral contact elements corresponding to the direction of the external force and with the area of contact corresponding to the intensity of the external force, thereby creating one or more signal of measurable resistance corresponding to the direction and intensity of the external force.

2. The analog deflection sensor according to claim 1 wherein said central contact element and said peripheral contact element are fabricated with receptacles to accept electrical connections.

3. The analog deflection sensor according to claim 1 wherein said peripheral contact elements are electrically resistive.

4. The analog deflection sensor according to claim 3 wherein said central contact element and said peripheral contact element are fabricated with receptacles to accept electrical connections.

5. An analog deflection sensor comprising:

an elastic electrically conductive central contact element, having a longitudinal axis;

two or more elastic electrically resistive peripheral contact elements which have longitudinal axis;

an elastic dielectric spacer which secures the peripheral contact elements at various angles surrounding the central contact element with their longitudinal axis parallel to the longitudinal axis of the central contact element;

said deflection sensor has an undeflected position, whereby no contact is established between said central contact element and said peripheral contact elements, which may be variably deflected by the application of an external force to establish electrical contact between said central contact element and at least one of said peripheral contact elements corresponding to the direction of the external force and with the area of contact corresponding to the intensity of the external force, thereby creating one or more signal of measurable resistance corresponding to the direction and intensity of the external force.

6. The analog deflection sensor according to claim 5 wherein said central contact element and said peripheral contact element are fabricated with receptacles to accept electrical connections.

7. An analog deflection sensor comprising:

a first elastic electrically resistive central contact element, having a longitudinal axis;

a second elastic electrically conductive central contact element, having a longitudinal axis;

an elastic dielectric spacer which secures the first central contact element next to the second central contact element with their longitudinal axis parallel to one another;

said deflection sensor has an undeflected position, whereby no contact is established between said central contact elements, which may be variably deflected by the application of an external force along a force line perpendicular to and intersecting the longitudinal axis of the first central contact element and the longitudinal axis of the second central contact element, to establish electrical contact between said central contact elements with the area of contact corresponding to the intensity of the external force, thereby creating a signal of measurable resistance corresponding to the intensity of the external force along the force line.

8. The analog deflection sensor according to claim 7 wherein said first central contact element and said second central contact element are fabricated with receptacles to accept electrical connections.

9. The analog deflection sensor according to claim 7 wherein said second central contact element is electrically resistive.

10. The analog deflection sensor according to claim 9 wherein said first central contact element and said second central contact element are fabricated with receptacles to accept electrical connections.

\* \* \* \* \*